(12) United States Patent
Rui (10) Patent No.: US 7,739,109 B2
(45) Date of Patent: Jun. 15, 2010

(54) SYSTEM AND PROCESS FOR MUTING AUDIO TRANSMISSION DURING A COMPUTER NETWORK-BASED, MULTI-PARTY TELECONFERENCING SESSION

(75) Inventor: Yong Rui, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1333 days.

(21) Appl. No.: 11/035,115

(22) Filed: Jan. 12, 2005

(65) Prior Publication Data

US 2006/0167995 A1 Jul. 27, 2006

(51) Int. Cl.
*G10L 21/02* (2006.01)
*H04B 15/00* (2006.01)
*H04M 1/20* (2006.01)

(52) U.S. Cl. .................. 704/227; 379/158; 379/421; 381/94.5

(58) Field of Classification Search .................. 704/201, 704/211, 270, 278, 226, 227; 379/158, 202.01, 379/204.01, 421; 386/53, 54; 381/94.5
See application file for complete search history.

(56) References Cited

U.S. PATENT DOCUMENTS 4,279,035 A * 7/1981 Skerlos .................... 455/158.3
4,356,509 A * 10/1982 Skerlos et al. ............... 348/552
4,467,140 A * 8/1984 Fathauer et al. ............. 455/462
4,509,138 A * 4/1985 Hayashi et al. ............. 715/201
5,666,541 A * 9/1997 Sellers ....................... 713/324
5,767,594 A * 6/1998 Cheng ........................ 307/125
5,768,601 A * 6/1998 Tran ........................... 713/300
5,987,106 A * 11/1999 Kitamura ................ 379/110.01
6,935,797 B2 * 8/2005 Sim ............................ 400/472
7,023,488 B2 * 4/2006 Szybiak et al. .............. 348/484
7,236,580 B1 * 6/2007 Sarkar et al. ........... 379/202.01
7,440,556 B2 * 10/2008 Bear et al. ................ 379/90.01
2005/0036814 A1 * 2/2005 Sim ............................ 400/472
2006/0128306 A1 * 6/2006 Jung et al. .................. 455/41.2
2008/0279366 A1 * 11/2008 Lindbergh ................... 379/421

OTHER PUBLICATIONS

Co-pending U.S. Appl. No. 10/663,390, "A System and Method For Real-Times Jitter Control and Packet-Loss Concealment in an Audio Signal", filed Sep. 15, 2004.

* cited by examiner

*Primary Examiner*—Martin Lerner
(74) *Attorney, Agent, or Firm*—Lyon & Harr, LLP; Richard T. Lyon (57) ABSTRACT

A system and process for muting the audio transmission from a location of a participant engaged in a multi-party, computer network-based teleconference when that participant is working on a keyboard, is presented. The audio is muted as it is assumed the participant is doing something other than actively participation in the meeting when typing on the keyboard. If left un-muted the sound of typing would distract the other participant in the teleconference.

6 Claims, 6 Drawing Sheets

SYSTEM AND PROCESS FOR MUTING AUDIO TRANSMISSION DURING A COMPUTER NETWORK-BASED, MULTI-PARTY TELECONFERENCING SESSION

BACKGROUND

1. Technical Field

The invention is related to multi-party, computer network-based teleconferencing, and more particularly to a system and process for muting the audio transmission of a participant using a keyboard during such a conference to prevent the other participants from hearing keyboard typing noise.

2. Background Art

Meetings are an important part of everyday life for businesses large and small. However, it is often inconvenient for meeting participants to be at the same location at the same time. When these distributed team members are not co-located, meetings are typically conducted using computer network-based teleconferences. A variety of live teleconferencing systems are available commercially to facilitate these meetings.

During these teleconferences, the participants tend to multi-task. For example, a participant may check or edit email, surf the web, and so on, while "attending" the meeting. In some situations, this multi-tasking is actually more efficient than attending the meeting all the time. The participant will only need to be attentive to the meeting when the discussion is relevant to the participant.

However, it has been observed that this multi-tasking typically involves the use of a computer keyboard, and conversely when the participant is actively participating in the meeting he or she is typically talking and not typing on their keyboard.

This keyboard activity by a multi-tasking meeting participant presents a problem. When a participant is typing on a keyboard, the typing sound will be captured by either a microphone associated with the participant's computer (if the teleconference audio is being handled via VoIP), or the participant's telephone (if the teleconference audio is being captured via a conventional telephone, and if a) the telephone PBX exposes APIs to control the phone or there is a dangle between the PC and phone so that the two can communicate). This is socially unacceptable, because other meeting participants will know that the participant is multi-tasking and not paying attention to the meeting, and the typing noise may be distracting to the other participants.

One solution can be for the multi-tasking participant to manually turn the audio transmission on and off. However, this is an impractical imposition on the participant and would restrict the participant's ability to spontaneously move between typing on the keyboard and talking with the other participants. The present invention resolves this dilemma, while still allowing a meeting participant to type on a keyboard and spontaneously participate in the meeting without having to manually turn the audio transmission on and off.

SUMMARY

The present invention is directed toward a system and process for muting the audio transmission from a location of a participant engaged in a multi-party, computer network-based teleconference when that participant is using a keyboard. The audio is muted as it is assumed the participant is doing something other than actively participating in the meeting when typing on the keyboard. If left un-muted the sound of typing would distract the other participant in the teleconference. The system and process generally involves first monitoring keyboard activity to determine when the participant is using his or her keyboard during the conference. More particularly, one way to accomplish this task is to monitor keyboard activity to determine when the participant strikes a key of the keyboard for the first time during the time audio is being transmitted from the participant's location to other participants in the teleconference. The first time the participant strikes the key, he or she is deemed to be using the keyboard. The key struck can be any key of the keyboard, or limited to any one of a group of prescribed keys of the keyboard, or even a single prescribed key.

In one embodiment of the present system and process, when it is found that the participant is using the keyboard, audio transmissions from the participant's location to other participants in the teleconference are suspended. However, in another embodiment, the audio transmissions are gradually muted. This prevents transient or inadvertent keystrokes from causing a full muting of the audio. One way of gradually muting the audio transmissions is to first establish the number of keystrokes typically occurring during a typing session involving the participant, or the duration of a typical typing session. In this case, a typing session is defined as the period of time a participant types before a keystroke threshold period is exceeded, where the keystroke threshold period represents a period of time which if exceeded without a keystroke occurring indicates the participant has stopped using the keyboard. Once the number of keystrokes or duration of a typical session has been established, the audio transmissions are gradually muted based on the number or duration, and a prescribed decreasing function such as a linearly decreasing function or an exponentially decreasing function.

The present system and process also includes a provision for re-establishing audio transmissions when a participant stops using his or her keyboard, based on the assumption that they are ready to actively participant in the teleconference. This involves first determining when a participant has stopped using the keyboard. If it is determined that the participant has stopped using the keyboard at a time when the audio transmissions from the participant's location is muted (or partially muted), then the transmissions are restored. It is noted that the actual audio connection between a muted participant and the other participants in the teleconference need not be terminated. Rather, just the audio gain is lowered to an inaudible level. One way of determining if a participant has stopped using their keyboard is to ascertain whether the participant has struck any key on the keyboard within a prescribed period of time. If not, it is deemed that the participant has stopped using the keyboard.

Another way to determining if a participant has stopped using their keyboard, involves recording the time each keystroke occurs after the audio transmission from the participant's location is suspended (or begun to be suspended). A keystroke threshold period is then established using the keystroke time data. This threshold represents the period of time, which if exceeded without a keystroke, indicates the participant has stopped using the keyboard. Thus, determining if a participant has stopped using their keyboard entails, for each keystroke made after the audio transmission from the participant's location is suspended (or begun to be suspended), first ascertaining if a new keystroke occurs within the keystroke threshold period. If no new keystroke occurs within the keystroke threshold period, the participant is deemed to have stopped using the keyboard.

In one embodiment of the present system and process, establishing the aforementioned keystroke threshold period involves assuming that the times between keystrokes follow a Gaussian or Poisson distribution. This being the case, the keystroke threshold period can be established by first computing the average time between keystrokes using the recorded keystroke times. Then, the standard deviation of the actual times between the keystrokes is computed. The keystroke threshold period is designated as being the average time plus a prescribed multiple of the standard deviation (e.g., 0-3 times). The keystroke threshold period can also be periodically updated.

The present system and process can further include a provision for allowing a participant to manually override the muting. More particularly, upon the receipt of a manual override command from the participant, the audio transmissions are prevented from being muted even if the participant starts using his or her keyboard. In addition, if the transmissions are already muted (or partially muted), the manual override will re-establishing the audio transmission to other participants in the teleconference.

Still further, the present system and process can include a provision for playing locally-generated audio when transmissions from a participant lacks audio data. When another participant in the teleconference starts using his or her keyboard and audio transmissions from that participant are muted as a result, the abrupt absence of an audio input from that participant may be noticeable to the other participants. Typically, the other participants would expect to hear so-called background noise from another participant's location even if that participant is not speaking. One way of preventing this situation is for the receiving participant to generate the missing background noise associated with another participant that is no longer transmitting audio. More particularly, incoming audio transmissions are monitored from each participant in the teleconference, and any participant who is no longer transmitting audio data is identified. Audio simulating background noise typical of previously transmitted audio data received from an identified participant is then generated and played for as long as the participant is not transmitting audio data.

It is also noted that detecting the absence of audio data transmissions can be a difficult task. This difficulty can be overcome by having a participant who is no longer transmitting audio data, instead transmit message frames indicating the audio from that participant is currently muted. The receiving participant would then be able to determine if a message frame is received from the participant in lieu of audio data, and if so deem the participant to be no longer transmitting audio data for purposes of generating the aforementioned background noise replacement.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 The Computing Environment

Figure 1:
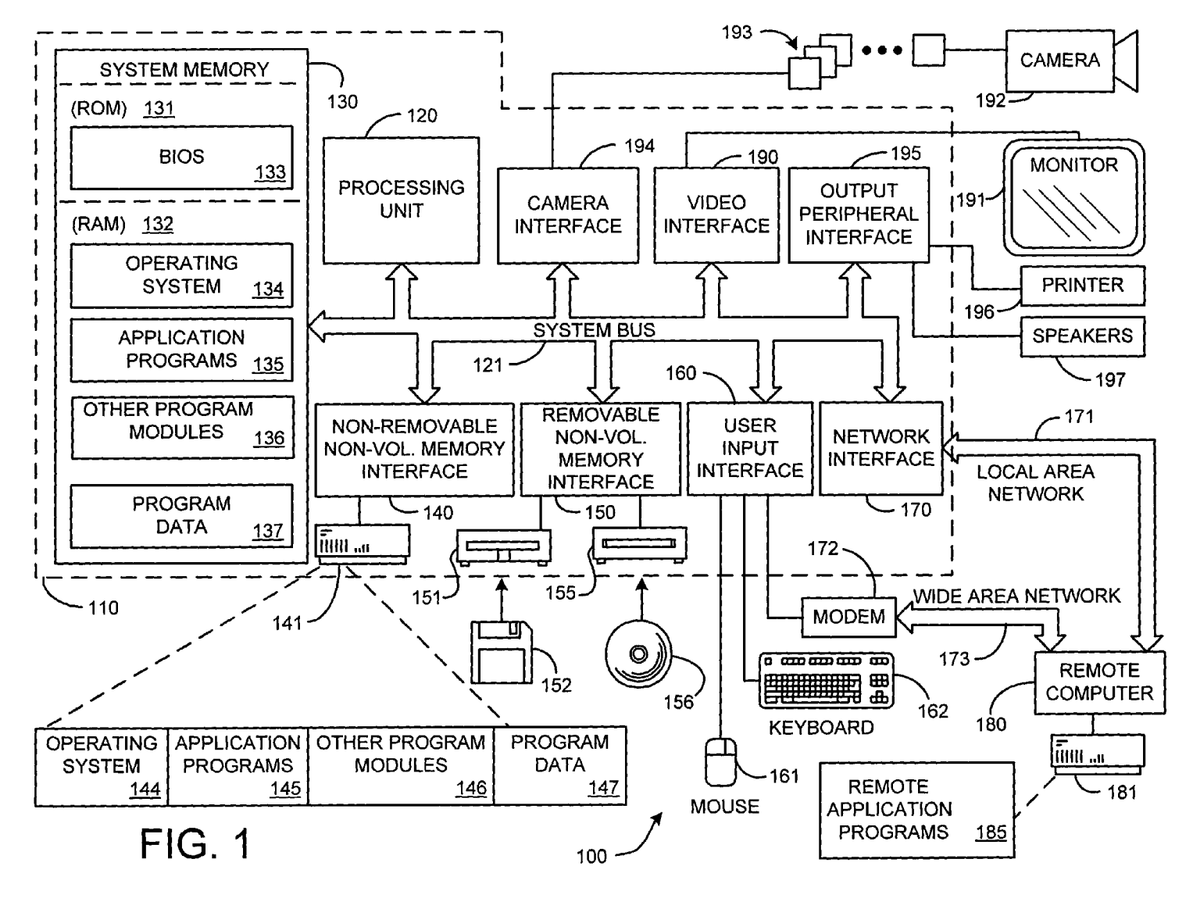
FIG. 1 is a diagram depicting a general purpose computing device constituting an exemplary system for implementing the present invention.

Before providing a description of the preferred embodiments of the present invention, a brief, general description of a suitable computing environment in which portions of the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. A camera 192 (such as a digital/electronic still or video camera, or film/photographic scanner) capable of capturing a sequence of images 193 can also be included as an input device to the personal computer 110. Further, while just one camera is depicted, multiple cameras could be included as input devices to the personal computer 110. The images 193 from the one or more cameras are input into the computer 110 via an appropriate camera interface 194. This interface 194 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 Muting System and Process

Figure 2:
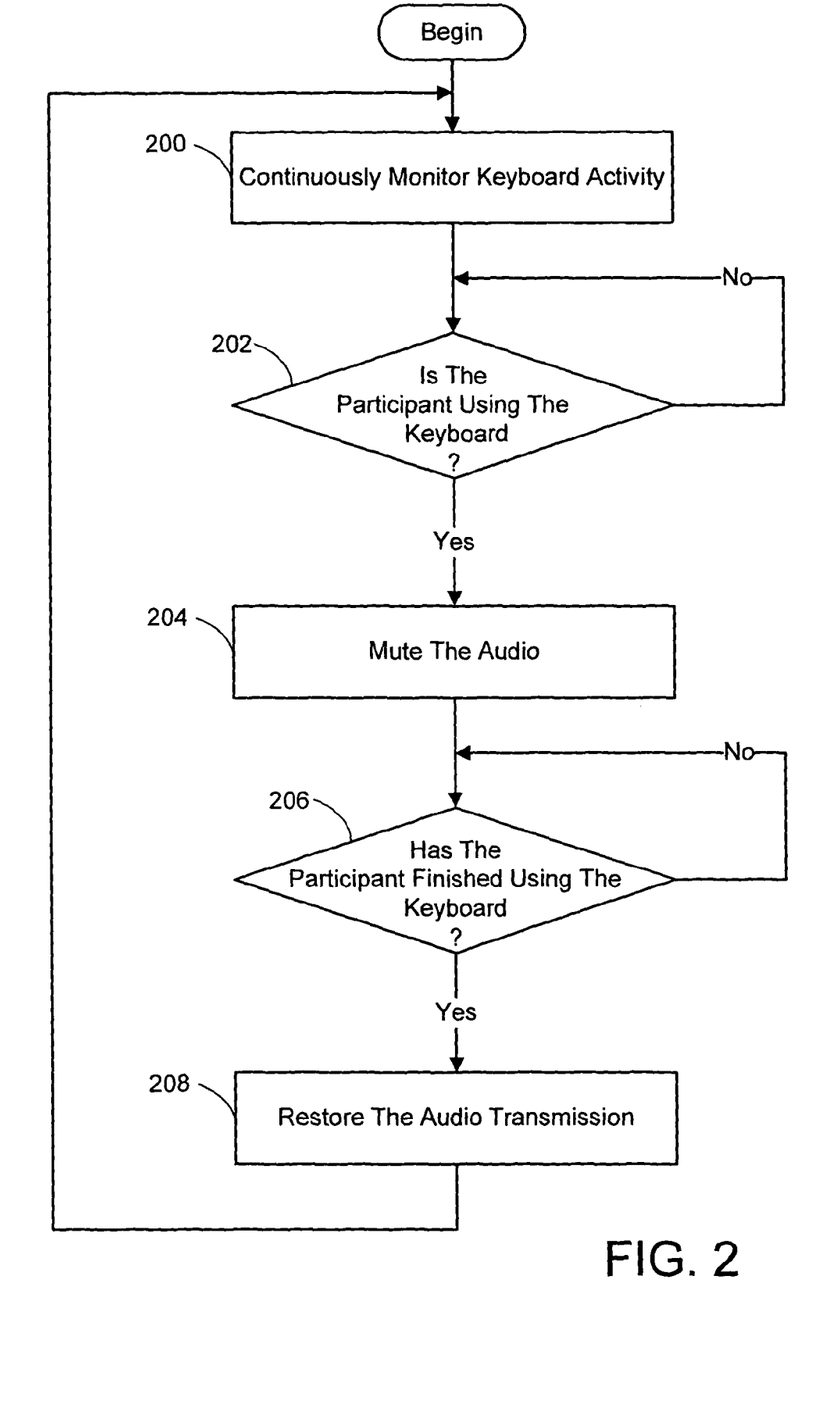
FIG. 2 is a flow chart diagramming a process for muting the audio transmission of a participant in a multi-party teleconference during times he or she is using a computer keyboard according to the present invention.

The present invention is embodied in a system and process for muting the audio transmission of a participant in a multi-party teleconference during times he or she is using a computer keyboard. In general, referring to FIG. 2, this involves the participant's computer continuously monitoring keyboard activity during the teleconference (process action 200), and determining when the participant is using the keyboard (process action 202). Whenever it is determined the participant is using the keyboard, in process action 204 the audio is muted (i.e., by suspending or gradually decreasing the "volume" of audio signal transmissions from the participant's location to the other participants). In addition, it is determined if a participant has finished using the keyboard (process action 206) after the audio has been muted. Whenever it is determined the participant has stopped, the audio transmission is restored (process action 208). This is done under an assumption that when the participant is not working on the keyboard, he or she wishes to participate in the meeting. Once the audio is restored, the procedure is repeated for as long as the teleconference is ongoing.

One way of determining when a participant has started or stopped using a keyboard is to monitor and analyze keystroke activity. For example, anytime a key on the keyboard is pressed for the first time, this can be used as a signal that the participant has begun to use the keyboard. The particular key that needs to be pressed can be a prescribed key, or one of a group of prescribed keys, or any key. Determining when the participant has finished using the keyboard can be done in several ways. For example, a prescribed time period between keystrokes could be established. The program would then monitor the participant's keyboard activity after the audio has been muted during a teleconference, and restore the audio transmission if there is no new keystroke within the prescribed time period from the last keystroke. Another way to determine if keyboard use has ceased is to record the time of each keystroke once the audio has been muted and perform a statistical analysis on the recorded data to establish a keystroke duration threshold and to deem the keyboard activity to have stopped if the time since the last keystroke exceeds the threshold. This has the advantage of accommodating various participants that may type at widely disparate rates, because a set time period may not accurately reflect when an extremely fast or extremely slow typist has ceased using the keyboard.

Figure 3:
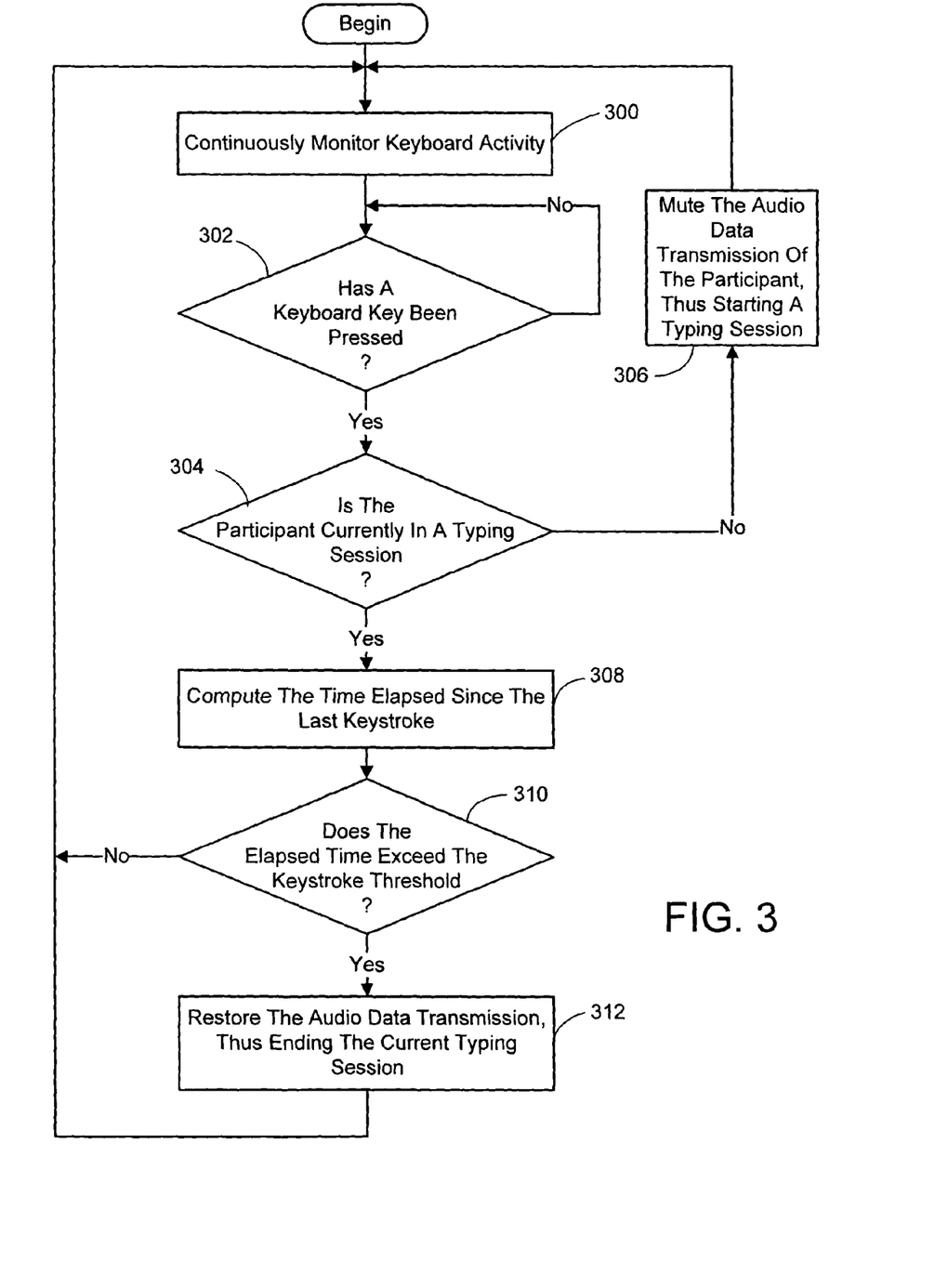
FIG. 3 is a flow chart diagramming an embodiment of the process of FIG. 2 employing a keystroke duration threshold approach.

More particularly, referring to FIG. 3, one embodiment the process for muting the audio transmission of a participant in a multi-party teleconference that employs the aforementioned keystroke duration threshold approach, begins by continuously monitoring keyboard activity (process action 300). While this monitoring is going on, it is determined if a key of the keyboard has been pressed (process action 302). If a key is pressed, it is next determined if the participant is currently in a typing session (process action 304). If not, the audio transmission for the participant is muted (process action 306) and process actions 300 through 304 are repeated. Thus, a typing session is entered. The muting can take on several forms as will be described shortly. Whenever it is determined that the participant is already in a typing session when a keystroke is detected, the time elapsed since the last keystroke is computed (process action 308). This elapsed time is then compared to the keystroke duration threshold to determine if it exceeds the threshold (process action 310). If not, then the foregoing process is repeated starting with process action 300. However, if the threshold is exceeded, then it is deemed in process action 312 that the current typing session has ended (i.e., the participant has stopped using his or her keyboard), and the audio is restored. The entire process is then repeated, starting with process action 300, for as long as the teleconference is ongoing.

Figure 4:
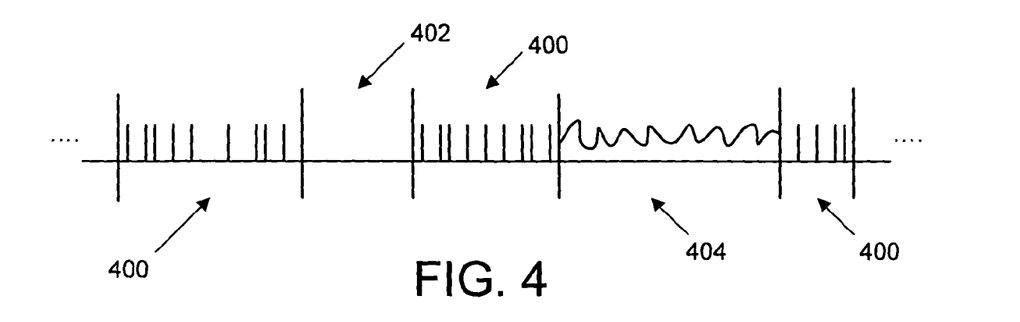
FIG. 4 is a simplified graph of an audio transmission timeline showing sessions exhibiting keyboard activity, silence or speech.
Figure 5:
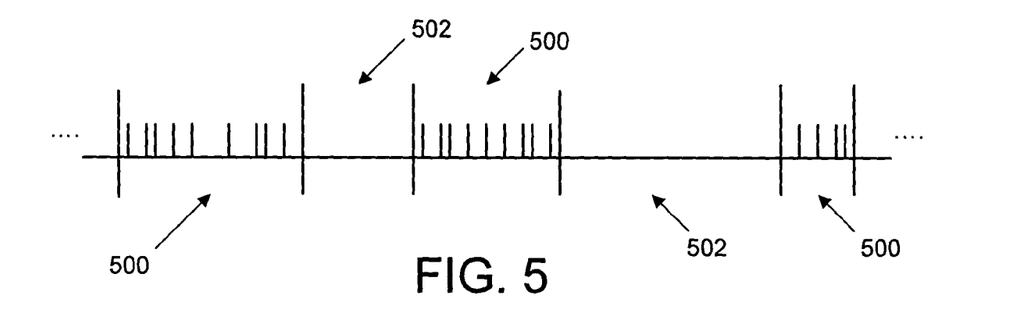
FIG. 5 is a simplified graph of an audio transmission timeline of FIG. 4 showing the keyboard activity sessions and classifying all other sessions as on-keyboard sessions.

In regard to the aforementioned statistical analysis of the keystroke time data to determine if keyboard use has ceased, this can be accomplished in one embodiment of the present system and process by assuming a Gaussian or Poisson distribution. For example, a teleconference can be thought of as consisting of multiple sessions, in terms of audio, as shown in FIG. 4. These sessions can be generally classified as keyboard sessions $S_k$ 400, silence sessions $S_l$ 402 and speech sessions $S_p$ 404. A keyboard session $S_k$ 400 is a session in which a participant is typing on a keyboard. A silence session $S_l$ 402 is a session in which there is no speech or keyboard noise. And finally, a speech session $S_p$ 404 is a session containing speech. For the purposes of the present system and process only the keyboard sessions $S_k$ 500 are important, and the other sessions can be collectively categorized as non-keyboard sessions $S_n$ 502, as shown in FIG. 5. Each keyboard session 600 is made up of individual keystrokes 602, which are represented by vertical lines in the session timeline shown in FIG. 6. In between each keystroke is a gap 604 representing the time period between two consecutive keystrokes.

Figure 6:
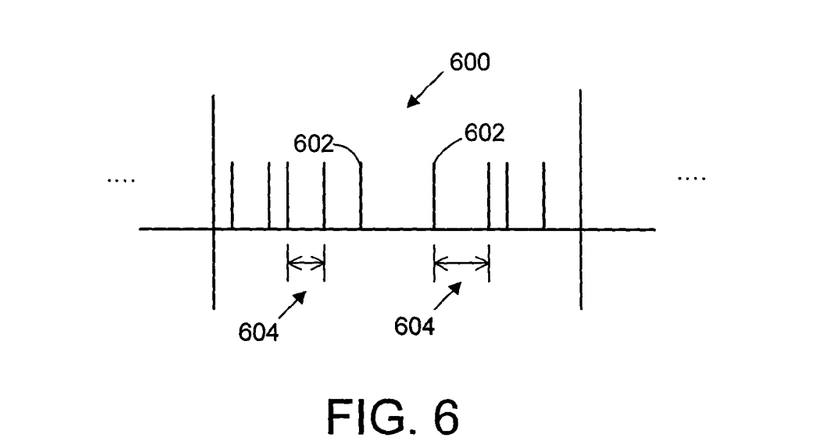
FIG. 6 is a simplified graph of an audio transmission timeline showing a keyboard activity session with its keystrokes and the gaps in time between the keystrokes.

Let the time between two consecutive keystrokes j and j+1 be $d_{k_{ij}}$ in keyboard session $S_{k_i}$, where i denotes the sequential number of the keyboard session within the overall audio timeline (i=0, 1, 2 . . . ) and j denotes the sequential number of the keystrokes within that session (j=0, 1, 2 . . . ) Given this, the keystroke duration threshold $T_{kd}$ can be characterized as:

$$T_{kd} = \mu_t + m\sigma_t, \quad (1)$$

where $\mu_t$ is the average duration between consecutive keystrokes, $\sigma_t$ is the standard deviation, and m is a multiplier factor. The average duration $\mu_t$ is characterized as, $$\mu_t = \frac{1}{L} \sum_{l=i-L}^{i} \left( \frac{1}{N_{k_l}} \sum_{j=0}^{j=N_{k_l}-1} d_{k_{ij}} \right) \quad (2)$$

where L is a prescribed number (e.g., 5) of the most recent keystroke sessions $S_{k_i}$, and $N_{k_i}$ is total number of keystrokes in keystroke session $S_{k_i}$. The standard deviation $\sigma_t$ is characterized as, $$\sigma_t = \sqrt{\frac{1}{L} \sum_{l=i-L}^{i} \left( \frac{1}{N_{k_l}} \sum_{j=0}^{j=N_{k_l}-1} (d_{k_{ij}} - \mu_t)^2 \right)}. \quad (3)$$

Thus, as can be seen from Eqs. (2) and (3), the average duration between keystrokes and the standard deviation are estimated for the current session $S_{k_i}$, based on previous sessions. The multiplier factor m adjusts the sensitivity of the keystroke duration threshold. In tested embodiments of the present invention, m ranged between 0 and 3.

It is noted that in one embodiment of the foregoing process, the keystroke duration threshold is updated each time a new typing session begins by recomputing the average duration and standard deviation. Additionally, in the case where the sequential number of the keyboard session i is less than the prescribed number of sessions L, a threshold value that was computed during a past teleconference can be employed, or a prescribed default threshold value could be used, until enough typing sessions have occurred to update the threshold value. The threshold value would then be updated with each new typing session thereafter.

As mentioned previously, the muting can take several forms. The simplest of these is that the audio gain is set to zero anytime it is determined a participant is using their keyboard. In this way, the audio is suspended from that participant immediately. However, in order to handle a situation where a participant might use his or her keyboard to type a quick note during a teleconference, or where the participant might inadvertently strike a key—but is still actively participating in the meeting, the program can be configured to gradually mute the audio once a keystroke occurs. In this way, any transient or inadvertent keystrokes would only result in a small reduction in the "volume" of the audio transmission, which would most likely be imperceptible to the other participants. One way to accomplish this gradual muting would be to reduce the volume of the audio transmission at some prescribed rate. However, given the different rates at which different people type, a statistical analysis may be more appropriate. For example, if a set muting rate is applied in the case of an extremely fast typist who is multitasking and not actively participating in the meeting, the rate might be to slow to prevent the typing from distracting the other participants in the teleconference.

Figure 7:
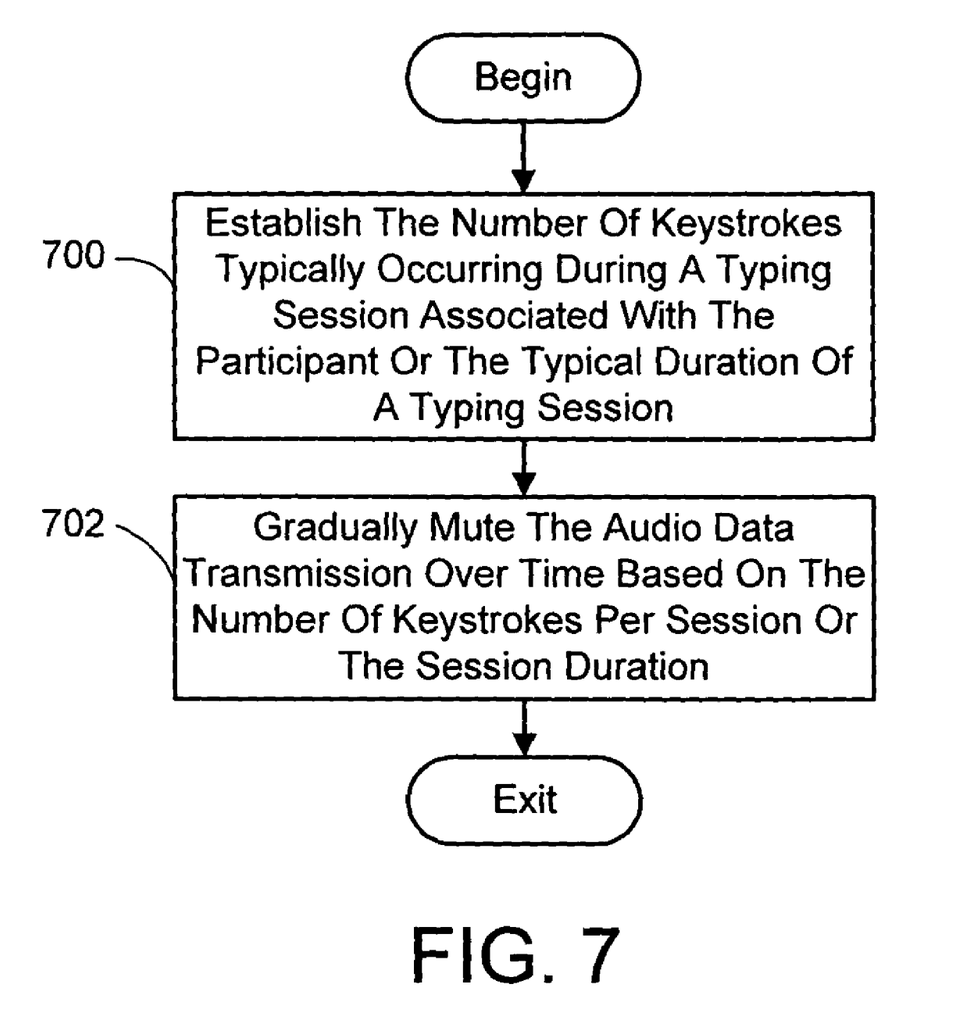
FIG. 7 is a flow chart diagramming a process for gradually muting the audio transmissions from the participant as part of the process of FIG. 2.

Referring to FIG. 7, this second analysis analyzes "global" keyboard activity to establish either the number of keystrokes typically occurring during a typing session associated with the participant under consideration or the typical duration of such a typing session (process action 700). Once established, the number of keystrokes per session, or session duration, is used to gradually mute the audio transmission over time based on a prescribed function (process action 702). In the case of the second statistical analysis, the typing sessions involved would have occurred in the past, such as during a past teleconference. The number-of-keystrokes-per-session value can be established based on some predefined number of typing sessions, or more preferably, continuously updated each time a new typing session occurs. It is noted that for the purposes of the foregoing analysis a typing session is defined as the period of time a participant types before the previously described keystroke duration threshold is exceeded since the last keystroke.

The aforementioned function used to compute the rate at which the muting takes place once a key of the keyboard is struck during a teleconference can be any simple linear function or exponential function. For example, one way to gradually reduce the audio gain g from a full audio transmission value of 1 to a fully muted value of 0 using the number of keystrokes in past typing sessions involves employing the linear equation:

$$g = 1 - \frac{1}{\mu_{k_n} + m\sigma_{k_n}} x \quad (4)$$

where $\mu_{k_n}$ is the average number of keystrokes in a $S_k$ session, $\sigma_{k_n}$ is the standard deviation of the number of keystrokes in the sessions, m is a multiplier factor, and x is the number of keystrokes so far in session $S_k$. The average number of keystrokes $\mu_{k_n}$ is characterized as, $$\mu_{k_n} = \frac{1}{L} \sum_{l=i-L}^{i} N_{k_l} \quad (5)$$

where L is again a prescribed number (e.g., 5) of the most recent keystroke sessions $S_{k_l}$, and $N_{k_l}$ is total number of keystrokes in keystroke session $S_{k_l}$. The standard deviation $\sigma_{k_n}$ is characterized as, $$\sigma_{k_n} = \sqrt{\frac{1}{L} \sum_{l=i-L}^{i} (N_{k_l} - \mu_{k_n})^2} \quad (6)$$

Another way to gradually reduce the audio gain g, this time using the duration of past typing sessions, involves employing the linear equation:

$$g = 1 - \frac{1}{\mu_{k_l} + m\sigma_{k_l}} x \quad (7)$$

where $\mu_{k_l}$ is the average duration of a $S_k$ session, $\sigma_{k_l}$ is the standard deviation of the session duration, m is a multiplier factor, and x is the number of seconds so far in session $S_k$. The average duration $\mu_{k_l}$ is characterized as, $$\mu_{k_l} = \frac{1}{L} \sum_{l=i-L}^{i} D_{k_l} \quad (8)$$

where L is again a prescribed number (e.g., 5) of the most recent keystroke sessions $S_{k_l}$, and $D_{k_l}$ is the duration of keystroke session $S_{k_l}$. The standard deviation $\sigma_{k_l}$ is characterized as, $$\sigma_{k_l} = \sqrt{\frac{1}{L} \sum_{l=i-L}^{i} (D_{k_l} - \mu_{k_l})^2} \quad (9)$$

It is noted that in the foregoing exemplary audio gain computations, the multiplier factor m adjusts the speed of the gradual muting. In tested embodiments of the present invention, m ranged between 0 and 3, however it could be larger if desired. Essentially, the bigger m is, the slower the audio gain is decreased.

It is further noted that in one embodiment of the foregoing processes, $\mu_{k_n}$ and $\sigma_{k_n}$, or $\mu_{k_l}$ and $\sigma_{k_l}$ as the case may be, are recomputed each time a new typing session begins using the last L typing sessions. Additionally, in the case where the prescribed number of sessions L have not yet occurred in the current teleconference (i.e., where the sequential number of the keyboard session i is less than the prescribed number of sessions L), $\mu_{k_n}$ and $\sigma_{k_n}$ values (or $\mu_{k_l}$ and $\sigma_{k_l}$ values) that were computed during a past teleconference can be employed, or prescribed default values can be used, until enough typing sessions have occurred to update these values. The $\mu_{k_n}$ and $\sigma_{k_n}$ values (or $\mu_{k_l}$ and $\sigma_{k_l}$ values) would then be updated with each new typing session thereafter.

It is also possible to gradually increase the gain of a participant's audio transmission after it is determined he or she has stopped using their keyboard, rather than immediately restoring the full audio. The function used to compute the rate at which the restoring takes place can be any simple linear function or exponential function similar to the previously described decreasing functions. For example, one way to gradually increase the audio gain g is to use the duration of past typing sessions by employing the linear equation:

$$g = 1 - \frac{1}{\mu_{k_l} + m\sigma_{k_l}} x \quad (7)$$

where $\mu_{k_l}$ is again the average duration of a $S_k$ session and $\sigma_{k_l}$ is the standard deviation of the session duration. However, in this case, m is the a multiplier factor that adjusts the speed of the gradual increase in the participant's audio. This value can range between 0 and 3, for example, however it could be larger if desired. Essentially, the bigger m is, the slower the audio gain is increased. In addition, in this case, x now represents the number of seconds so far in the current non-keyboard session $S_n$.

The present system and process can further include a manual override function so that a participant can either prevent the audio from being muted during a teleconference even if he or she is typing on a keyboard, or re-establish full audio transmission even though the participant continues to type. In operation this feature could be implemented by designating a special override key on the keyboard, or the participant might be required to activate the override via interaction with an appropriate Graphic User Interface (GUI).

It is noted that the present system and process mutes the audio transmission from a participant's location during a teleconference—it does not disable audio capture. In this way, local operations dependent on audio input are not effected.

When the present system and process is employed to mute the audio of a participant in a multi-party teleconference, the abrupt absence of an audio input from that participant may be noticeable to the other participants. Typically, the other participants would expect to hear so-called background noise from another participant's location even if that participant is not speaking. Like typing noise, the abrupt absence of all audio for a participant can be distracting and indicate to the other participants that a participant is no long paying attention to the meeting. One way of preventing this situation is to include a feature that generates the missing background noise associated with another participant that is no longer transmitting audio. While any existing method of generating this background noise can be adopted for use in the present system and process, in tested embodiments, a new approach was employed that is the subject of a co-pending application entitled "A System And Method For Real-Time Jitter Control And Packet-Loss Concealment In An Audio Signal", which was assigned to a common assignee. The co-pending application was filed on Sep. 15, 2004 and assigned Ser. No. 10/663,390.

In general, the co-pending application generated background noise, which was referred to as comfort noise, and which was intended to fill in gaps in an incoming audio signal. This is accomplished by simulating a noise level similar to any noise that was present when the audio connection was active, but when there was no speech. Consequently, signal loss is not readily apparent to the listener. The co-pending application described the generation of this comfort noise essentially as follows. Comfort noise is generated by using a running comfort noise buffer containing a number of "silence frames" (where silence frame are previously received audio frames not containing speech). In a tested embodiment, using a comfort noise buffer of about three or so silence frames provided good results. In general, whenever a new frame is received, the overall energy E of the frame is computed and compared to the stored energy of the current silence frames in the comfort noise buffer. If the current frame has lower energy than any of the frames already in the comfort noise buffer, then the frame having the highest energy is replaced with the current frame. Further, in addition to storing the energy of the frame, the magnitude of the FFT coefficients of the frames is also stored for use in synthesizing a "comfort noise frame". A periodic renewal of the silence frames in the buffer can also be forced through use of a time-out mechanism so as to avoid an atypically low energy silence frame remaining in the buffer forever. For example, if a particular frame is in the buffer for over a predetermined time limit, such as, for example, 15 seconds, the nominal energy $E_i$ of the frame is increased (but not the magnitude of the stored FFT coefficients). This will increase the likelihood that the frame will eventually be replaced with a new frame having lower energy. Assuming a 15 second time limit here, the $E_i$ is doubled every 15 seconds, and a small amount of an arbitrary frame, such as the current frame, for example, is added to handle any cases where $E_i=0$. When a comfort noise frame is needed, the buffered silence frames are then used to generate one. In particular, the average magnitude of the stored silence frames is computed, and a random phase shift is added to the FFT prior to computing the inverse FFT. This signal is then overlapped/added to the signal in the buffer using a conventional window, such as, for example, a sine window. In particular, comfort noise is created in any desired length by computing the Fourier transform of the average magnitude of the silence frames, introducing a random rotation of the phase into the FFT coefficients, and then simply computing the inverse FFT for each session to create the comfort noise frame. This produces a signal frame having the same spectrum, but no correlation with the original frames, thereby avoiding perceptible artifacts in the signal. In addition, longer signals can be obtained by zero-padding the signal before computing the FFT. These synthesized comfort noise frames are then inserted into the signal playback by using a windowing function to smooth the transition points between the original and subsequent signal frames.

Figure 8:
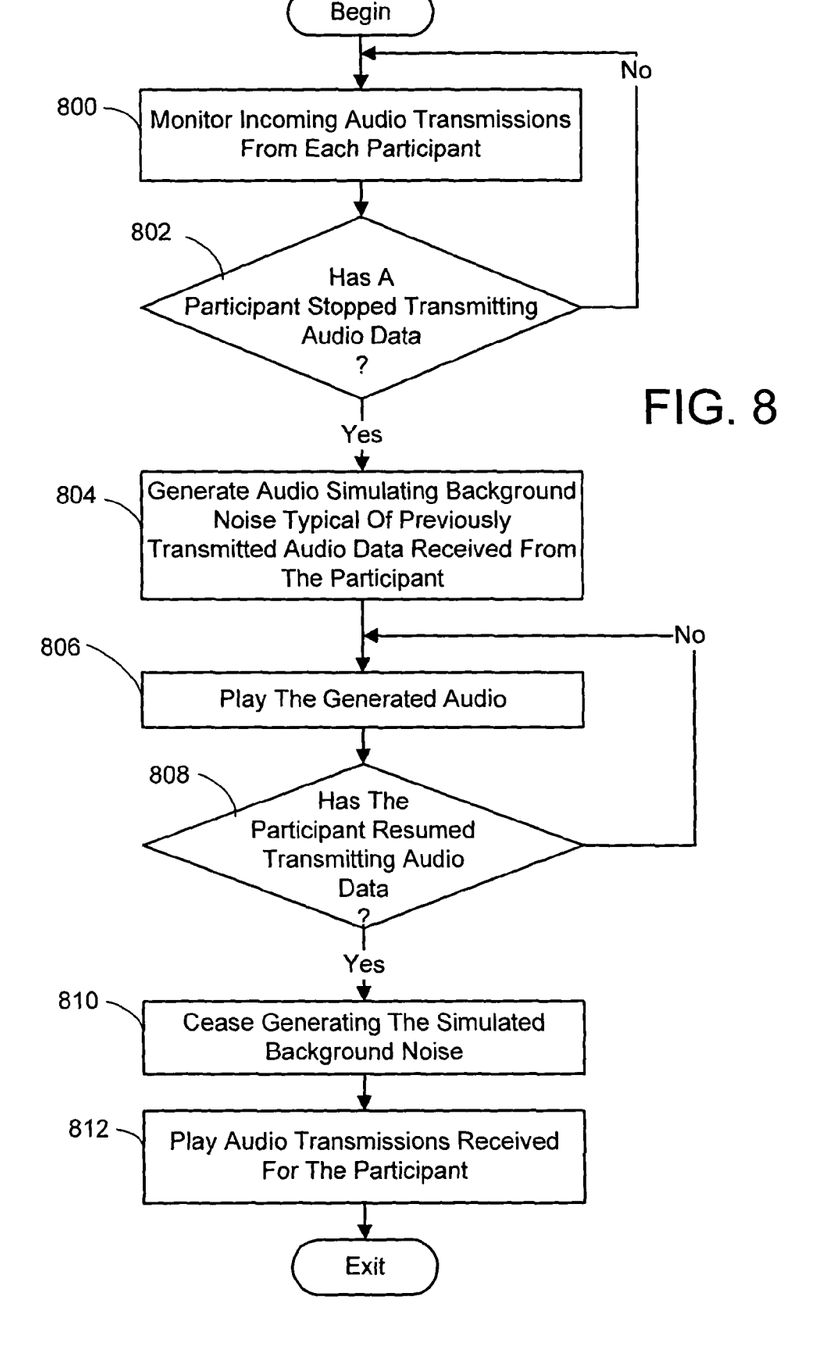
FIG. 8 is a flow chart diagramming a process for playing locally-generated audio whenever transmissions from a participant in a teleconference lacks audio data.

Thus, referring to FIG. 8, the procedure for playing locally-generated audio whenever transmissions from a participant in a multi-party, computer network-based teleconference lacks audio data involves first monitoring incoming audio transmissions from each participant in the teleconference (process action 800) and determining if a participant is no longer transmitting audio data (process action 802). If so, then audio simulating background noise typical of previously transmitted audio data received from that participant is generated (process action 804). The generated audio is then played (process action 806) until it is determined that the participant is once again transmitting audio data (process action 808). At that point the generation of the simulated background noise ceases (process action 810) and the actual audio transmissions are played instead (process action 812).

It is noted that the incoming audio signals will have to be audited in order to detect whether the audio transmission for a participant has ceased. There are conventional techniques for doing this, but it can be tricky because, for example, packet losses over the network might cause some audio frames to be dropped, which in turn could appear to be a cessation of the audio from a participant. One way to mitigate this problem of detecting when the audio from a participant has been fully muted is to configure the present system and process so that instead of a participant's computer simply ceasing transmission of audio frames, the frames are replaced with a message frame indicating that the audio is muted. When another participant receives this type of message frame in lieu of an audio frame, the present system and process would generate the aforementioned background or comfort frame to replace it. This message frame could be as simple as an appropriate header followed by a single bit that when present indicates the participant transmitting this frame has fully muted the audio transmission.

Wherefore, what is claimed is:

1. A system for muting the audio data transmission from a location of a participant engaged in a multi-party, computer network-based teleconference, comprising:
    a general purpose computing device having an associated keyboard;
    a computer program comprising program modules executable by the computing device, wherein the computing device is directed by the program modules of the computer program to,
        monitor keyboard activity to determine when the participant is using the keyboard; and
        gradually mute the audio data transmissions from the participant's location to other participants in the teleconference whenever it is determined that the participant has begun using the keyboard, wherein said gradually muting comprises,
            establishing a keystroke number representing the number of keystrokes typically occurring during a typing session involving the participant, wherein a typing session is defined as the period of time a participant types before a keystroke threshold period is exceeded, and wherein the keystroke threshold period represents a period of time which if exceeded without a keystroke occurring indicates the participant has stopped using the keyboard, and
            gradually muting the audio data gain over time based on the keystroke number and a prescribed decreasing function.

2. The system of claim 1, wherein the prescribed decreasing function is one of (i) a linearly decreasing function, or (ii) an exponentially decreasing function.

3. A system for muting the audio data transmission from a location of a participant engaged in a multi-party, computer network-based teleconference, comprising:
    a general purpose computing device having an associated keyboard;
    a computer program comprising program modules executable by the computing device, wherein the computing device is directed by the program modules of the computer program to,
        monitor keyboard activity to determine when the participant is using the keyboard; and
        gradually mute the audio data transmissions from the participant's location to other participants in the teleconference whenever it is determined that the participant has begun using the keyboard, wherein said gradually muting comprises,
            establishing a typical typing session duration involving the participant, wherein a typing session is defined as the period of time a participant types before a keystroke threshold period is exceeded, and wherein the keystroke threshold period represents a period of time which if exceeded without a keystroke occurring indicates the participant has stopped using the keyboard, and
            gradually muting the audio data gain over time based on the typical session duration and a prescribed decreasing function.

4. The system of claim 3, wherein the prescribed decreasing function is one of (i) a linearly decreasing function, or (ii) an exponentially decreasing function.

5. A system for muting the audio data transmission from a location of a participant engaged in a multi-party, computer network-based teleconference, comprising:
    a general purpose computing device having an associated keyboard;
    a computer program comprising program modules executable by the computing device, wherein the computing device is directed by the program modules of the computer program to,
        monitor keyboard activity to determine when the participant is using the keyboard;
        gradually mute the audio data transmissions from the participant's location to other participants in the teleconference whenever it is determined that the participant has begun using the keyboard;
        determine when a participant has stopped using the keyboard, said determination comprising,
            recording a time of each keystroke on the keyboard after the audio data transmission from the participant's location is suspended,
            establishing a keystroke threshold period representing a period of time which if exceeded without a keystroke indicates the participant has stopped using the keyboard, said establishing comprising,
                computing an average time between keystrokes of a prescribed number of the most recently occurring past typing sessions,
                computing a standard deviation of the times between the keystrokes of said typing sessions, and
                designating the keystroke threshold period to be the average time plus a prescribed multiple of the standard deviation,
            for each keystroke on the keyboard after the audio data transmission from the participant's location is suspended, determining if a new keystroke occurs within the keystroke threshold period, and
            whenever no new keystroke occurs within the keystroke threshold period, deeming the participant to have stopped using the keyboard; and
        whenever it is determined that the participant has stopped using the keyboard at a time when the audio data transmission from the participant's location is muted, gradually restore the audio data transmission to other participants in the teleconference.

6. The system of claim 5, wherein the prescribed multiple is three.

* * * * *